April 25, 1961 V. C. WILSON 2,981,857
COUNTING TUBE
Filed Feb. 29, 1956

$$E = \frac{V}{(R-x)\ \ln R/r}$$

Inventor:
Volney C. Wilson,
by Paul A. Frank
His Attorney.

_United States Patent Office_

2,981,857
Patented Apr. 25, 1961

2,981,857

COUNTING TUBE

Volney Colvin Wilson, Scotia, N.Y., assignor to General Electric Company, a corporation of New York Filed Feb. 29, 1956, Ser. No. 568,480

4 Claims. (Cl. 313—61)

This invention refers to an improved counting tube for the detection of radiation and, more particularly, to a proportional counter which provides maximum efficiency and maximum sensitivity uniformity throughout its entire length for the measurement of an axially directed neutron flux.

Since neutrons, having no associated charge, cannot be detected directly, resort must be had to a measurement of a reaction which they produce. The most convenient method employs a proportional counter filled with boron trifluoride gas, $BF_3$, enriched in the proportion of the boron-10 isotope which has a high capture cross-section for thermal neutrons. The probability that an impinging neutron will be accepted into the nucleus of the $B^{10}$ atom is relatively high. Such capture initiates a nuclear transformation evidenced by the emission of an alpha particle and the transmutation of boron-10 to lithium-7. The alpha particle and the recoil lithium-7 ion produce collision electrons along their paths through the gas of the counter. The resulting ionization is proportional to the number of neutrons captured and is employed to give an indication of the neutron flux density.

Conventionally, the counting tube or counter has a conducting cylindrical wall maintained at a high negative potential relative to a coaxial central wire collector, producing an electrostatic field in the gas volume to accelerate free electrons toward the collector. Gas tight end closures are provided which define the length of the counter volume and provide support for the collector.

The original collision electrons produce, by collisions with gas molecules in the region near the central wire, additional free electrons which are in turn accelerated and by collision produce more free electrons. The sequence continues until the charge migration reaches and is collected by the positive collector. This charge multiplication results in an output pulse of sufficient magnitude to energize a counting or integrating circuit associated with the counter.

The sum of the path lengths of the alpha particle and the lithium-7 ion is only a few millimeters, much less than the diameter of a counter. However, the original collision electrons must reach the region of very high potential within about $1/10$ millimeter of the collector before they acquire sufficient energy per mean free path to sustain the charge multiplication. Therefore, electrons produced along a path which is in a region of low potential may be lost by attachment and recombination before they can contribute to an output pulse. The probability of free electrons reaching the required energy to initiate a charge multiplication may be termed "survival probability" and is a function of the potential in the region of a given path. If the radial electrostatic field distribution were uniform throughout the counter, neutrons captured at the same distance from the collector at any point along the length of the counter would be equally efficient in producing an output pulse.

In prior counters there is an appreciable portion of the sensitive volume near the ends of the counter where the electrostatic field is reduced due to the presence of end closures which do not support a potential gradient across their surfaces similar to that across the internal volume of the counter. In these end regions, the survival probability is less than in the internal volume of the counter. This makes it difficult to correlate counting rates with the density of the incident neutron flux.

Where a counter is used to measure flux in a columnated beam perpendicular to the axis, the effective volume of the tube may be approximated and discrepancies due to the end regions neglected as second order effects. However, when used to measure neutrons in an axial beam, knowledge of the field distribution in the end regions becomes more important because it is in the entrant end region that most neutron captures will occur. Further, since a greater portion of the neutron capture occurs where the field potential is not sufficient to assure the production of a charge multiplication for an axial beam, there is an efficiency loss in conventional counters of about 12 to 15%.

Prior counters are unable to withstand high temperatures due to the failure of the conventional end closures. This limits the flexibility of application and, more significantly, prevents the use of high temperature outgassing techniques. Insufficient outgassing is a major cause of counter failure, usually placing the upper limit on counter life at about $10^9$ counts.

It is therefore an object of this invention to provide an improved counting tube for the detection of radiation which is capable of withstanding high temperatures and which has a greater useful life.

A further object of this invention is to provide an end window proportional counter for neutron detection which has maximum sensitivity uniformity throughout its entire length.

A still further object is to provide an end window proportional counter having maximum efficiency for the detection of an axially directed neutron flux.

According to the illustrated embodiment of this invention, there is provided a neutron proportional counter having planar ceramic end closure means which serve as entrant windows for a neutron flux and as insulating supports for a collector and which allow a uniform potential gradient to be maintained throughout the entire length of the counter.

The novel features believed characteristic of the invention are set forth in the appended claims. The invention itself, together with further objects and advantages thereof, may best be understood by reference to the following description, taken in connection with the accompanying drawing, in which:

Figure 1:
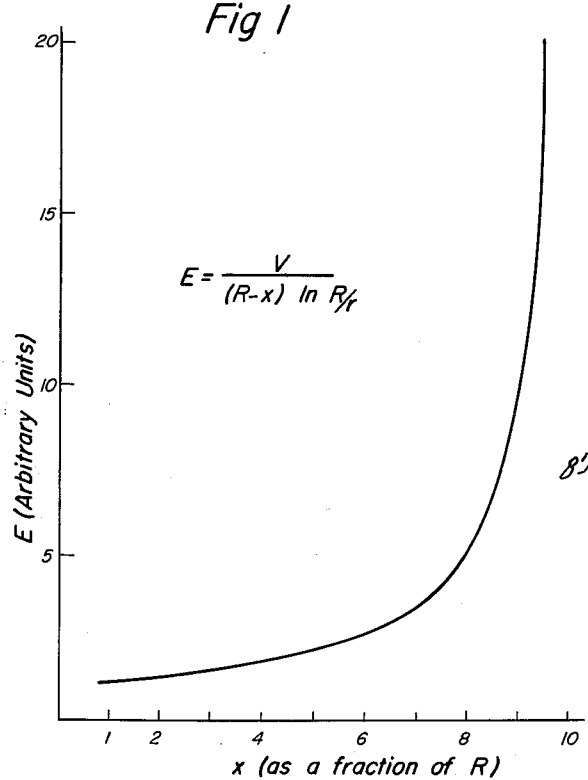
Fig. 1 is a graph of an electrostatic field for an ideal cylindrical counter.

Referring now to Fig. 1, the relationship for the electrostatic field of an ideal cylindrical counter is plotted according to the relationship:

$$E = \frac{V}{(R-x)\ln(R/r)}$$

where E is the field at a distance $x$ from a cylindrical cathode of radius R and V is the voltage applied between the cathode and an anode of radius $r$.

It may be seen that the field increases exponentially toward the center of the counter so that electrons produced in the counter are accelerated at an increasing rate as they approach the collector. It is only in the region within approximately $1/10$ millimeter of the central wire that electrons will be accelerated sufficiently to acquire the energy per mean free path necessary to sustain a charge multiplication.

Since neutron capture may occur at any point in the counter volume, some of the tracks of the alpha particles and of the recoil lithium-7 ions will occur in regions of low potential where electrons will be lost due to attachment and recombination before they have been accelerated sufficiently to themselves produce additional collision electrons. Hence, the observed counting rate may be directly equated to the product of the theoretical efficiency of the counter and the neutron flux density only when the field distribution of Fig. 1 is maintained throughout the entire length of the counter.

Figure 2:
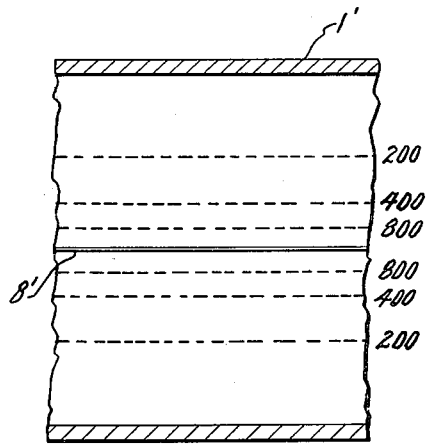
Fig. 2 is a section of a cylindrical counter in which lines of equal electric potential are illustrated.

Fig. 2 illustrates lines of equal electric potential near an end of a cylindrical counter represented by cathode 1' and anode 8'. Curves for fields of 200, 400, and 800, in arbitrary units, are shown for the ideal case where equipotential lines are all parallel to the axis of the counter. Equal potential surfaces may be generated by rotating each of the dotted curves about the axis of symmetry. In prior counters the equipotential lines deviate from the shape shown at the end regions due to the loss of cylindrical geometry associated with the end closures.

For example, counters have been made employing thin metal foil disks as end closures and with the central wire supported by means of insulating axial beads attached to the centers of the foils. In such a construction the equipotential lines curve toward the axis of the counter along the bead and create an appreciable volume at the end region where the survival probability is low and difficult to estimate. A significant proportion of the neutron captures occur in the entrant end region when an axially directed neutron flux is being measured so that the realizable efficiency is reduced by about 12 to 15% by the distorted field in such a counter.

Figure 3:
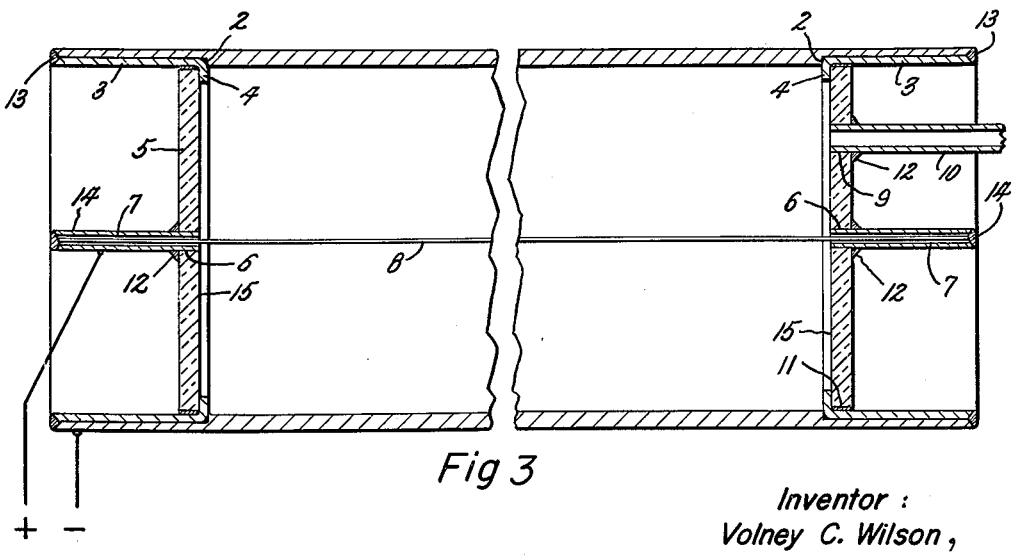
Fig. 3 is a cross-sectional side view of a preferred embodiment of the present invention.

Fig. 3 illustrates an end window neutron proportional counter constructed according to this invention. The opposite ends of the counter are generally similar and like reference numerals are applied to like elements. Near each end of the conducting metal cylinder 1 there is a shoulder 2 turned on the inside for positioning an adapter 3, which is formed with an inwardly spun lip 4 to retain the end closure 5. The end closure is apertured as at 6 to provide access for a tubular support 7 for the central wire collector 8. At least one of the end closures is also apertured as at 9 for a filling tube 10. Each of the counter components, except for the end closures, is metallic, preferably brass or steel. The energizing potential is applied across the counter volume by connecting the negative side of a high voltage source to the outer cylinder 1 and the positive side to the central wire 8 by means of one of the support tubes 7.

The end closures 5, according to this invention, each comprise a flat circular disc of a ceramic material consisting essentially of alumina, $Al_2O_3$, which has been found to produce a surface resistivity which allows the maintenance of surface field distribution very closely approximating the field distribution across a radial plane in the internal free volume of the counter. Such field distribution establishes equipotential surfaces throughout the entire volume of the counter which are essentially cylindrical shells closely approximating those of a counter of infinite length, as shown in Fig. 2.

Pure alumina, however, may allow permeation by the boron trifluoride and deterioration of the gas pressure in the counter. A ceramic material consisting essentially of alumina and a glassy phase which is sufficiently gas-tight and yet maintains the required surface resistivity is therefore the preferred material for the end closures.

A ceramic consisting essentially of from 80 to 98% by weight of alumina in the form of corundum crystals and the balance of silicate glass may be used advantageously, the silicate glass in the preferred embodiment of this invention consisting essentially of alkaline earth oxides which are herein considered as including oxides of magnesium. However, in the preferred embodiment of this invention, the end closures are formed from a ceramic consisting essentially of 96% by weight of alumina, 3% of silica, and 1% of magnesia.

The end closures 5 are assembled into the adapters 3 and affixed as at 11 by high temperature metal-to-ceramic bonding techniques employing for example a nickel-titanium eutectic. The filling and support tubes 7 and 10 are similarly bonded to the ceramic as at 12. After the central wire 8 is strung between the support tubes 7, the adapters are positioned in the cylinder and welded as at 13 and the wire 8 is tensioned and welded to the support tubes at 14. The counter as a unit may then be outgassed, filled with the boron trifluoride, and the filling tube 10 sealed by pinching and welding.

The end closures are formed with interior surfaces 15 which are substantially planar and which are oriented in planes perpendicular to the axis of symmetry of the counter. The gas volume is that of a simple right cylinder which may be easily measured. Due to the high surface resistivity of the ceramic material, the charge distribution across the interior surface of the end closures does not distort the electric potential gradient at the end regions of the counter. Hence, equipotential surfaces throughout the entire volume of the counter are concentric cylindrical shells. The sensitivity of the counter is uniform over its entire length, resulting in maximum counting efficiency and obviating counting rate dependence upon the directional aspect of the incident neutron beam.

An end window neutron counter constructed in this manner is able to withstand temperatures in the neighborhood of 1,000° C. This results in greater flexibility in the application of the counter and allows the use of outgassing techniques which employ high temperatures. For example, heating a counter to 1,000° C. in an atmosphere of hydrogen has resulted in an increase in the useful life of from $10^9$ counts to about $10^{12}$ counts.

While this construction is especially applicable where axially directed neutron beams of low flux density are to be measured, it is readily adaptable to a wide range of other applications and it is intended in the appended claims to cover all such changes and modifications as fall within the true spirit and scope of this invention.

What I claim as new and desire to secure by Letters Patent of the United States is:

1. A radiation counter comprising a hollow conducting cylinder, ceramic end closures at each end of said cylinder, and a conducting wire located coaxially of said cylinder and supported at spaced points along its length by said end closures, the inner surfaces of said end closures being substantially within parallel planes perpendicular to and intersecting said wire and said cylinder, said ceramic end closures comprising a composition of 96% alumina, 3% silica, and 1% magnesia, to provide a substantially uniform radial electrostatic field distribution throughout the full length of said counter in response to voltage applied between said cylinder and said wire.

2. An end window proportional counter for neutrons, said counter comprising a hollow conducting cylinder, vacuum-tight ceramic end closures in said cylinder at each end thereof for providing neutron permeable windows, and a conducting wire located coaxially of said cylinder and supported at spaced points along its length by said end closures, the inner surfaces of said end closures being substantially within parallel planes perpendicular to and intersecting said wire and said cylinder to provide a substantially uniform radial electrostatic field distribution throughout the full length of said counter in response to voltage applied between said cylinder and said wire.

3. An end window proportional counter for neutrons, said counter comprising a hollow conducting cylinder, ceramic end closures at each end of said cylinder providing neutron permeable windows, and a conducting wire located coaxially of said cylinder and supported at spaced points along its length by said end closures, the inner surfaces of said end closures being substantially within parallel planes perpendicular to and intersecting said wire and said cylinder, said ceramic end closures comprising a composition of from 80 to 98% by weight of corundum crystals, the remainder of said composition comprising silica and alkaline earth oxides, to provide a substantially uniform radial electrostatic field distribution throughout the full length of said counter in response to voltage applied between said cylinder and said wire.

4. An end window proportional counter for neutrons, said counter comprising a hollow conducting cylinder, ceramic end closures at each end of said cylinder providing neutron permeable windows, and a conducting wire located coaxially of said cylinder and supported at spaced points along its length by said end closures, the inner surfaces of said end closures being substantially within parallel planes perpendicular to and intersecting said wire and said cylinder, said ceramic end closures comprising a composition of 96% alumina, 3% silica, and 1% magnesia, to provide a substantially uniform radial electrostatic field distribution throughout the full length of said counter in response to voltage applied between said cylinder and said wire.

References Cited in the file of this patent
UNITED STATES PATENTS

| | | |
|---|---|---|
| 2,457,781 | Metten et al. | Dec. 28, 1948 |
| 2,534,922 | Marshall | Dec. 19, 1950 |
| 2,604,600 | Neufeld | July 22, 1952 |
| 2,837,678 | Hendee et al. | June 3, 1958 |
| 2,845,560 | Curtis et al. | July 29, 1958 |

OTHER REFERENCES

Rossi et al.: Ionization Chambers and Counters, published 1949 by McGraw-Hill, pp. 198–202 relied on.